United States Patent
Wang (10) Patent No.: US 8,542,553 B2
(45) Date of Patent: Sep. 24, 2013

(54) DOWNHOLE SONIC LOGGING TOOL INCLUDING IRREGULARLY SPACED RECEIVERS

(75) Inventor: Tsili Wang, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 566 days.

(21) Appl. No.: 12/700,546

(22) Filed: Feb. 4, 2010

(65) Prior Publication Data

US 2011/0188345 A1    Aug. 4, 2011

(51) Int. Cl.
*G01V 1/00* (2006.01)

(52) U.S. Cl.
USPC ............................................................ 367/34

(58) Field of Classification Search
USPC ...................................................... 367/34, 31
See application file for complete search history.

(56) References Cited

U.S. PATENT DOCUMENTS

| | | | |
|---|---|---|---|
| 3,299,400 A * | 1/1967 | Trowbridge et al. | 367/27 |
| 3,374,851 A * | 3/1968 | Brokaw | 367/27 |
| 4,383,308 A * | 5/1983 | Caldwell | 367/31 |
| 4,575,828 A * | 3/1986 | Williams | 367/31 |
| 4,594,691 A | 6/1986 | Kimball et al. | |
| 4,683,556 A * | 7/1987 | Willis | 367/31 |
| 4,683,557 A * | 7/1987 | Willis | 367/31 |
| 4,698,792 A | 10/1987 | Kurkjian et al. | |
| 4,774,693 A | 9/1988 | Winbow et al. | |
| 4,779,236 A | 10/1988 | Sondergeld | |
| 4,972,384 A * | 11/1990 | Williams | 367/75 |
| 5,278,805 A | 1/1994 | Kimball | |
| 5,639,997 A | 6/1997 | Mallett | |
| 5,780,784 A | 7/1998 | Robbins | |
| 5,852,262 A | 12/1998 | Gill et al. | |
| 5,886,303 A | 3/1999 | Rodney | |
| 5,936,913 A | 8/1999 | Gill et al. | |
| 6,470,275 B1 | 10/2002 | Dubinsky | |
| 6,614,360 B1 | 9/2003 | Leggett, III et al. | |
| 6,631,327 B2 | 10/2003 | Hsu et al. | |
| 6,661,737 B2 | 12/2003 | Wisniewski et al. | |
| 6,671,224 B1 | 12/2003 | Pabon | |
| 6,678,616 B1 | 1/2004 | Winkler et al. | |
| 6,714,480 B2 | 3/2004 | Sinha et al. | |
| 6,766,252 B2 | 7/2004 | Blanch et al. | |

(Continued)

FOREIGN PATENT DOCUMENTS

WO    WO2011097432    *    8/2011

OTHER PUBLICATIONS

X. M. Tang, et al., "Shear-Velocity Measurements in the Logging-While Drilling Environment: Modeling and Field Evaluations," Petrophysics, vol. 44, No. 2 (Mar.-Apr. 2003), pp. 79-90.

(Continued)

*Primary Examiner* — Daniel Pihulic
(74) *Attorney, Agent, or Firm* — Kenneth Liu; Jeremy Berman; Brigitte J. Echols (57) ABSTRACT

A downhole acoustic measurement tool includes at least one transmitter longitudinally spaced apart from a non-uniformly spaced longitudinal array of acoustic receivers. The array has a non-uniform spacing such that a first spacing between a first pair of consecutive acoustic receivers in the array is not equal to a second spacing between a second pair of consecutive acoustic receivers in the array. Non-uniform spacing of the receivers in the array reduces aliasing when the received waveforms are processed, for example, to obtain semblance data.

15 Claims, 7 Drawing Sheets

(56) References Cited

U.S. PATENT DOCUMENTS

| | | |
|---|---|---|
| 6,791,899 B2 | 9/2004 | Blanch et al. |
| 7,035,924 B2 | 4/2006 | DeLuca et al. |
| 7,089,119 B2 | 8/2006 | Mandal |
| 7,646,674 B2 | 1/2010 | Yogeswaren et al. |
| 7,660,200 B2 | 2/2010 | Tang |
| 7,675,814 B2 | 3/2010 | Mandal |
| 2006/0062082 A1 | 3/2006 | Mandal |
| 2006/0285439 A1 | 12/2006 | Haugland |
| 2007/0107938 A1 | 5/2007 | Cornish et al. |
| 2009/0276159 A1* | 11/2009 | Strobbia ............ 702/17 |
| 2011/0188345 A1* | 8/2011 | Wang ................ 367/34 |
| 2011/0286307 A1* | 11/2011 | Wang ................ 367/82 |

OTHER PUBLICATIONS

X. M. Tang, et al., "A dispersive-wave processing technique for estimating formation shear velocity from dipole and Stoneley waveforms," Petrophysics, vol. 60, No. 1 (Jan.-Feb. 1995), pp. 19-28, 9 Figs.

G. L. Varsamis, et al, "LWD Shear Velocity Logging in Slow Formations Design Decisions and Case Histories," SPWLA 41st Annual Logging Symposium, Jun. 4-7, 2000, Paper O.

C. H. Cheng and M. N. Toksoz, "Elastic Wave Propagation in a Fluid-Filled Borehole and Synthetic Acoustic Logs," Geophysics, vol. 46, No. 7, Jul. 1981, pp. 1042-1053.

D. P. Schmitt, "Shear Wave Logging in Elastic Formations," J. Acoust. Soc. A., 84(6), Dec. 1988, pp. 2215-2229.

M. T. Taner, F. Koehler, and R. E. Sheriff, "Complex seismic trace analysis," Geophysics, vol. 44, No. 6 (Jun. 199); pp. 1041-1063.

C. H. Cheng and M. Nfi Toksoz, "Determination of Shear Wave Velocities in "Slow" Formations," SPWLA 24th Annual Logging Symposium, Jun. 37-30, 1983, Paper V.

Georgios L. Varsamis, et al., "A New MWD Full Wave Dual Mode Sonic Tool Design and Case Histories," SPWLA 40th Annual Logging Symposium, May 30-Jun. 3, 1999, Paper P.

F. El-Wazeer, et al., "Applications for a Full Wave Sonic LWD Tool in the Middle East," Society of Petroleum Engineers 13th Middle East Oil Show & Conference, Apr. 5-8, 2003, SPE 81474.

Jennifer Market, et al., "Processing and Quality Control of LWD Dipole Sonic Measurements," SPWLA 43rd Annual Logging Symposium, Jun. 2-5, 2002, Paper PP.

Chaur-Jian Hsu and Kikash K. Sinha, "Mandrel effects on the dipole flexural mode in a borehole," J. Acoust. Soc. Am. 104(4), Oct. 1998, pp. 2025-2039.

International Preliminary Report on Patentability of PCT Application Serial No. PCT/US2011/023679 dated Aug. 16, 2012.

\* cited by examiner

DOWNHOLE SONIC LOGGING TOOL INCLUDING IRREGULARLY SPACED RECEIVERS

RELATED APPLICATIONS

None.

FIELD OF THE INVENTION

The present invention relates generally to acoustic logging of subterranean formations. More particularly, this invention relates to an acoustic measurement tool configured to reduce aliasing effects.

BACKGROUND OF THE INVENTION

The use of acoustic (e.g., audible and/or ultrasonic) measurement systems in prior art downhole applications, such as logging while drilling (LWD), measurement while drilling (MWD), and wireline logging applications, is well known. Such acoustic measurement systems are utilized in a variety of downhole applications including, for example, borehole caliper measurements, measurement of drilling fluid properties, and the determination of various physical properties of a formation. In one application, acoustic waveforms may be generated at one or more transmitters deployed in the borehole. The acoustic responses may then be received at an array of longitudinally spaced apart receivers deployed in the borehole. Acoustic logging in this manner provides an important set of borehole data and is commonly used in both LWD and wireline applications to determine compressional and shear wave velocities (also referred to as slownesses) of a formation.

It will be appreciated that the terms slowness and velocity are often used interchangeably in the art. They will likewise be used interchangeably herein with the understanding that they are inversely related to one another and that the measurement of either may be converted to the other by simple and known mathematical calculations. Additionally, as used in the art, there is not always a clear distinction between the terms LWD and MWD. Generally speaking MWD typically refers to measurements taken for the purpose of drilling the well (e.g., navigation) whereas LWD typically refers to measurements taken for the purpose of analysis of the formation and surrounding borehole conditions. Nevertheless, these terms are herein used synonymously and interchangeably.

In the analysis of acoustic logging measurements, the received acoustic waveforms are typically coherence processed to obtain semblance data which may be displayed on a time-slowness plot. In a time-slowness plot, also referred to as a slowness-time-coherence (STC) plot or a semblance plot, a set of several signals from the array of acoustic receivers is processed with the incorporation of separate time shifts for each received signal. The separate time shifts are based on a slowness value assumed for the purpose of processing the waveforms. The processing provides a result, known as coherence, which can signify the presence of a discernable signal received by the separate receivers. In this manner compressional and shear wave arrivals can be discerned in the received waveforms. One well known problem with this technique is that aliasing of the compressional arrival often interferes with a shear wave arrival. This aliasing effect may mask or mimic the presence of a shear wave signal and tends to be particularly harmful when the alias is close to an expected shear wave arrival time.

One way to address the problem of aliasing is to move the acoustic receivers closer together on the downhole measurement tool. Changing the spacing in the array of receivers alters the aliasing effect. In general, the smaller the receiver spacing, the farther the alias tends to be moved away from a potential shear wave arrival. However, reducing the receiver spacing also reduces array coverage unless more receivers are added. Moreover, a reduction in receiver array coverage, which increases the uncertainty in the coherence slowness analysis. Additional receivers to mitigate the reduction in array coverage are known to increase the cost and complexity of the downhole tool.

Therefore, there exists a need for an improved downhole measurement tool that can be used for determining a shear wave velocity of a subterranean formation, and that addresses one or more of the shortcomings described above. In particular, it will be appreciated that a downhole measurement tool that reduces the aliasing effect without excessively reducing the overall receiver array coverage, or increasing the expense of the tool, would be highly advantageous, since many of the above stated disadvantages would thus be obviated.

SUMMARY OF THE INVENTION

The present invention addresses one or more of the above-described drawbacks for making formation acoustic logging measurements. In one exemplary embodiment, the invention includes a downhole acoustic measurement tool that has at least one transmitter longitudinally spaced apart from a non-uniformly spaced longitudinal array of acoustic receivers. In certain preferred embodiments, the array includes first and second subarrays of acoustic receivers in which the spacing between consecutive receivers in the first subarray is not equal to the spacing between consecutive receivers in the second subarray. The acoustic receivers are configured to receive acoustic energy emitted by the transmitter. Received waveforms may be processed, for example, in a coherence/semblance analysis to obtain semblance data and to further obtain compressional and shear wave velocities (or slownesses).

Exemplary embodiments of the present invention provide several technical advantages. For example, the non-uniform spacing of the array of receivers advantageously reduces (or even substantially eliminates) aliasing when the received waveforms are processed, for example, to obtain semblance data. Reducing the aliasing effect advantageously reduces interference with shear wave arrivals. This is particularly advantageous in applications in which the received waveforms are processed downhole to obtain the semblance data and in which the downhole processor is further utilized to obtain (or pick) the shear wave slownesses from the semblance data.

Moreover, the use of non-uniformly spaced receivers in the present invention tends to enable the reduction in aliasing to be achieved with little or no loss of array coverage and little or no increase in the uncertainty in the coherence slowness analysis. These advantages can be further achieved without incurring additional fabrication costs (in that the acoustic measuring tool requires no additional receivers)

In one aspect the present invention includes a downhole acoustic measurement tool. The tool includes at least one acoustic transmitter deployed on a downhole tool body, the transmitter being configured to transmit an acoustic waveform into a subterranean borehole. An array of receivers is deployed on an external surface of the tool body. The array includes a plurality of longitudinally spaced apart acoustic receivers, the acoustic receivers being longitudinally spaced apart from the transmitter and configured to receive a transmitted acoustic waveform. The array has a non-uniform spacing such that a first spacing between a first pair of consecutive acoustic receivers in the array is not equal to a second spacing between a second pair of consecutive acoustic receivers in the array.

In another aspect, the present invention includes a downhole acoustic measurement tool. The tool includes at least one acoustic transmitter deployed on a downhole tool body, the transmitter being configured to transmit an acoustic waveform into a subterranean borehole. An array of receivers is deployed on an external surface of the tool body. The array includes first and second subarrays, each of which includes a plurality of longitudinally spaced apart acoustic receivers, the acoustic receivers being longitudinally spaced apart from the transmitter and configured to receive a transmitted acoustic waveform. The first subarray has a first spacing between consecutive receivers and the second subarray has a second spacing between consecutive receivers such that the first spacing is not equal to the second spacing.

In still another aspect, the present invention includes a downhole acoustic measurement tool. The tool includes at least one acoustic transmitter deployed on a downhole tool body, the transmitter being configured to transmit an acoustic waveform into a subterranean borehole. An array of receivers is deployed on an external surface of the tool body. The array includes first and second subarrays, each of which includes a plurality of longitudinally spaced apart acoustic receivers, the acoustic receivers being longitudinally spaced apart from the transmitter and configured to receive a transmitted acoustic waveform. The first subarray has a first spacing between consecutive receivers and the second array has a second spacing between consecutive receivers. The second subarray is longitudinally spaced apart from the first array by a third spacing that differs from at least one of the first spacing and the second spacing.

In yet another aspect, the present invention includes a downhole acoustic measurement tool. The tool includes at least one transmitter deployed on a downhole tool body, the transmitter being configured to transmit an acoustic waveform into a subterranean borehole. An array of receivers is deployed on an external surface of the tool body. The array including first and second subarrays, each of which includes a plurality of longitudinally spaced apart acoustic receivers, the acoustic receivers being longitudinally spaced apart from the transmitter and configured to receive a transmitted acoustic waveform. The first and second subarrays have identical spacing between consecutive receivers. At least a portion of the second subarray is interleaved with at least a portion of the first subarray so as to define an interarray distance that is less than one-half the spacing between consecutive receivers in the first array.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

With respect to FIGS. 1 through 9, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 9 may be described herein with respect to that reference numeral shown on other views.

Figure 1:
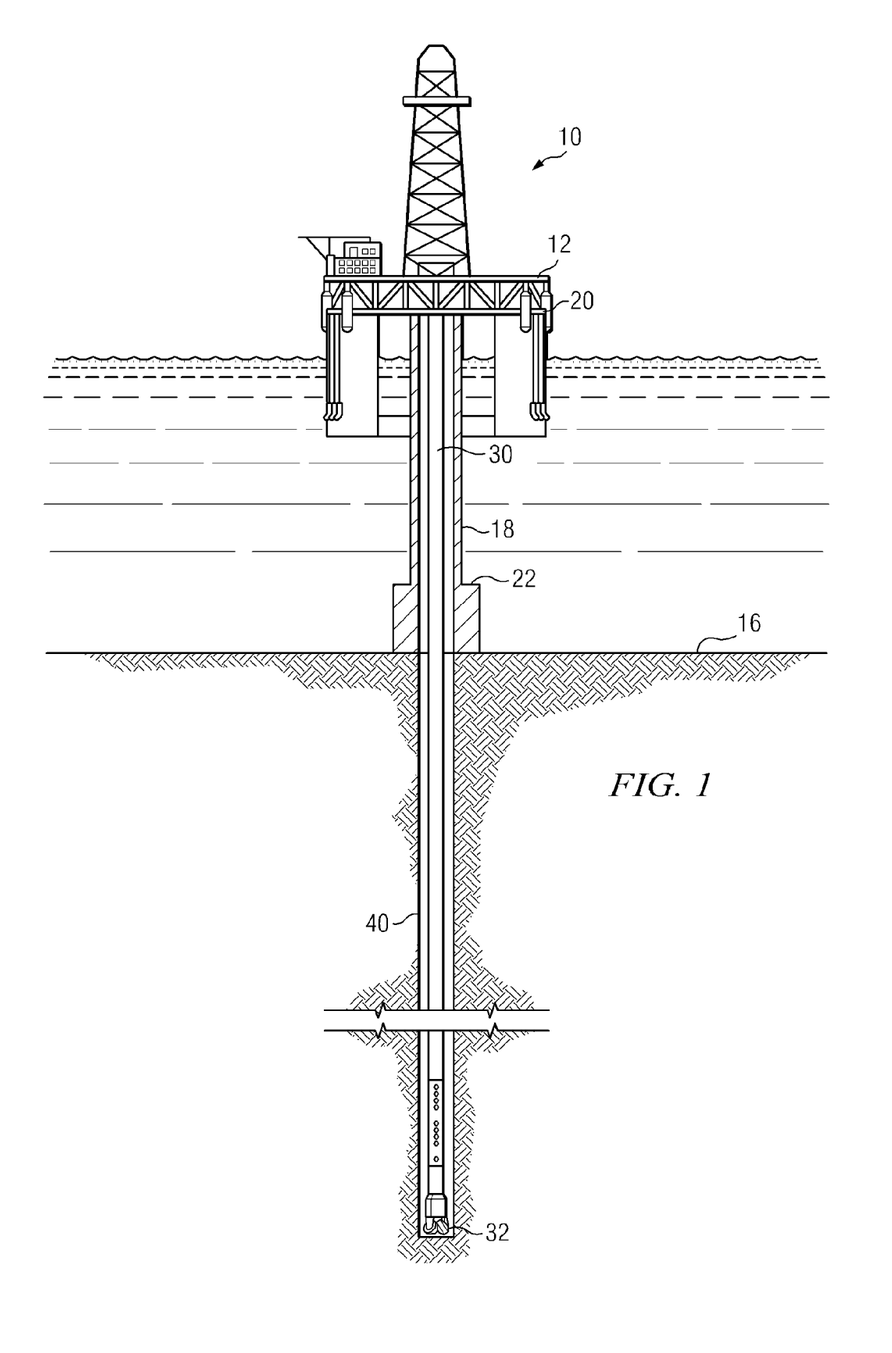
FIG. 1 schematically illustrates one exemplary embodiment of an acoustic logging tool according to this invention in use in an offshore oil or gas drilling assembly.

FIG. 1 schematically illustrates one exemplary embodiment of an acoustic logging tool 100 according to this invention in use in an offshore oil or gas drilling assembly, generally denoted 10. In this disclosure, and in the accompanying claims, an acoustic logging tool may also be referred to as a downhole acoustic measurement tool, or as a downhole measurement tool. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and an acoustic logging tool 100. In the embodiment shown, and described in more detail below, for example, with respect to FIG. 4, the acoustic logging tool 100 includes at least one transmitter 120 deployed with a longitudinal array of non-uniformly spaced receivers 140. Drill string 30 on FIG. 1 may further include a downhole drill motor, a mud pulse telemetry system, and one or more other sensors, such as a nuclear logging instrument and/or an acoustic caliper tool, for sensing downhole characteristics of the borehole and the surrounding formation. The invention is not limited in these regards.

It will be understood by those of ordinary skill in the art that the acoustic logging tool 100 of the present invention is not limited to use with a semisubmersible platform 12 as illustrated in FIG. 1. Acoustic logging tool 100 is equally well suited for use with any kind of subterranean drilling operation, either offshore or onshore. While logging tool 100 is particularly well suited for LWD applications, it will be understood that logging tools in accordance with the invention may also be used in wireline applications, and not only in combination with a drill string 30. Before describing acoustic logging tool 100 in more detail in connection with FIG. 4, features of a prior art tool are discussed.

Figure 2:
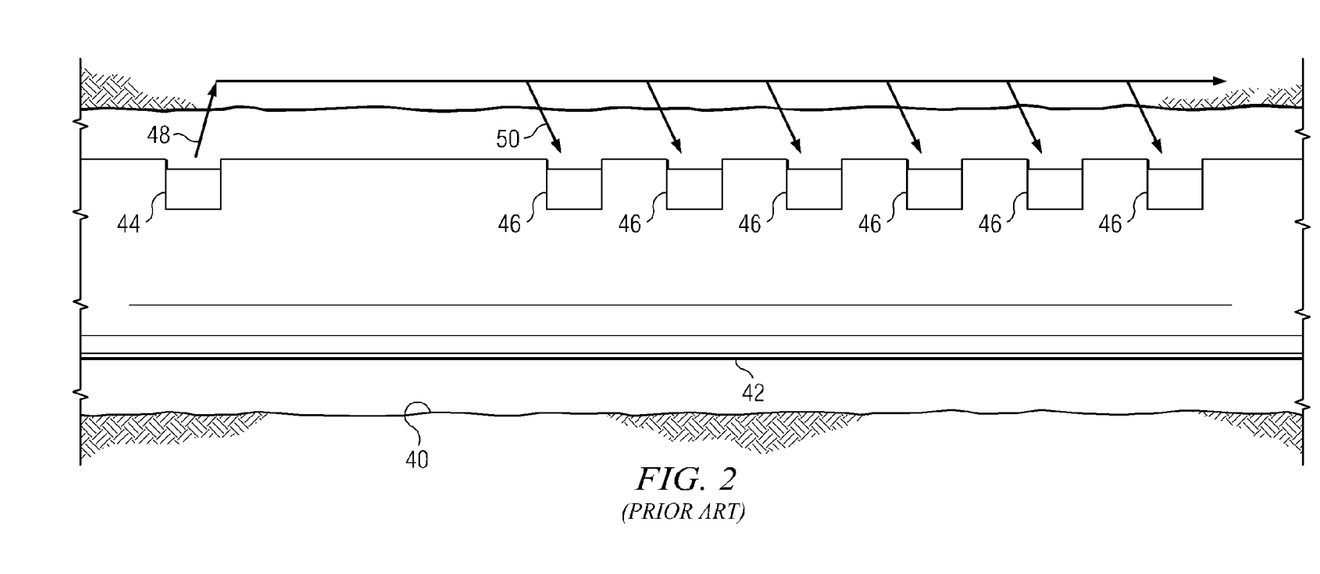
FIG. 2 depicts a cross sectional view of a portion of a prior art acoustic logging while drilling tool deployed in a borehole.

FIG. 2 depicts a cross sectional view of a portion of a prior art acoustic logging while drilling tool 42 deployed in a borehole 40. Logging tool 42 is similar to that disclosed in commonly assigned U.S. Pat. No. 7,039,524 to Haugland and includes a transmitter 44 longitudinally offset from a receiver array having a plurality of longitudinally spaced apart acoustic receivers 46. As shown, the receivers 46 are equally (or uniformly) spaced, e.g., at a spacing between about 6 and 12 inches. During acoustic logging operations, the transmitter 44 transmits acoustic energy into the borehole as depicted at 48. A portion of the transmitted energy enters the formation and induces compressional and/or shear waves therein.

It will be appreciated that acoustic energy may also be transmitted from the transmitter to the receivers through the borehole annulus and through the tool body. Such "borehole guided waves" and tool modes are well known in the art and may be readily accommodated. Hence, there is no further discussion herein of borehole guided waves and tool modes.

The compressional and shear waves induced by the transmitted acoustic energy propagate through the formation and are received at the receivers 46 as depicted at 50. As is known to those of ordinary skill in the art, the received compressional and shear waves may be utilized to determine compressional and shear wave velocities or slownesses of the formation (e.g., including conventional time-of-flight calculations). The compressional and shear wave velocities are related to compressive and shear strengths of the surrounding formation, and thus provide useful information about the formation.

As mentioned above, prior art acoustic logging tools collect waveforms via the array of equally spaced receivers 46. These received waveforms are typically coherence processed to obtain formation compressional and shear wave velocities (slownesses). As is well known to those of ordinary skill in the art, one problem with the use of a conventional downhole sonic tool, such as acoustic logging tool 42, is that aliasing of the compressional arrival often interferes with the shear wave arrival. Depending on the receiver spacing and the formation shear velocity, the aliasing "arrival" may interfere with and/or be confused with a shear wave arrival.

Before describing exemplary embodiments of the present invention and discussing how the invention reduces aliasing, conventional coherence semblance analysis is reviewed. U.S. Pat. No. 4,594,691, "Sonic Well Logging," issued to Kimball et al., Jun. 10, 1986 (the Kimball patent), discusses a process for performing this analysis, also referred to as a Slowness-Time-Coherence (STC) analysis. As described in the Kimball patent, a transmitter on an acoustic logging tool transmits a sonic pulse p(t). The acoustic receivers in the array receive waveforms $s_k(t)$, where the consecutive receivers in the array are labeled with the index k=0, 1, ..., K−1, with k increasing with increasing distance from the transmitter, and K being the number of receivers in the array. Denoting the distance between the transmitter and the $k^{th}$ receiver by $z_k$, then in an ideal homogeneous formation, the pulse p(t) travels undistorted between the transmitter and the $k^{th}$ receiver at a slowness D, and the waveform at the $k^{th}$ receiver may have the form:

$$s_k(t) = p(t - Dz_k) \qquad \text{Equation 1}$$

The moveout of the pulse along the array of receivers in the acoustic logging tool tends to be linear in the distance separating the transmitter and each receiver. In this idealized situation, for example, the pulse arrives at the receiver closest to the transmitter at a time:

$$T = Dz_0 \qquad \text{Equation 2}$$

In a real subterranean logging environment, there can be (and typically are) imperfections in the acoustic logging tool, for example, minor differences in receiver fabrication. Moreover, properties of the subterranean formation can be less than ideal, including, for example, heterogeneities that affect acoustic propagation. For these and other reasons, the received acoustic waveforms typically include distortion, as well as noise. Although pulse arrivals may typically move out linearly across the array of receivers, the arrival time of the pulses at the different receivers may be only weakly dependent on the slowness D.

Conventional semblance analysis is intended to overcome these difficulties by taking advantage of the coherence properties of the energy carried by the received waveforms. As mentioned above, the received acoustic waveforms include both distortion of the original pulse and noise. The distortions and noise tend to be independent from receiver to receiver. Therefore, in adding waveforms from different receivers, the distortions and noise tend to add incoherently, whereas the underlying signal due to the original pulse may be considered to add coherently across the receivers (when the received waveforms are shifted by an appropriate time shift before being added together).

The energy density in an acoustic waveform is generally proportional to the square of the amplitude of the acoustic waveform. Integrating this density over the duration of the pulse provides a measure of the energy carried by the waveform. Hence, a measure of the total acoustic energy received by the array of receivers may be expressed mathematically as follows:

$$E(T, D) = \int_0^{T_W} \left[ \sum_{k=0}^{K-1} s_k(t + (T + D(z_k - z_0))) \right]^2 dt \qquad \text{Equation 3}$$

where $T_W$ is a time window over which the integral is taken, the time window being large enough to include the duration of the pulse. The coherent energy among the set of acoustic waveforms received by the array of receivers may be expressed mathematically as follows:

$$E_c(T, D) = \int_0^{T_W} \sum_{k=0}^{K-1} [s_k(t + (T + D(z_k - z_0)))]^2 dt \qquad \text{Equation 4}$$

In these energy integrations, the waveforms $s_k( )$ have shifted arguments, where the shifts are based on the longitudinal receiver spacing. It is to be noted that these expressions depend on values for T and D (the arrival time of the pulse and the appropriate slowness). Finally, the coherence measure of semblance may be defined by the following ratio:

$$R^2(T, D) = \frac{1}{K} \frac{E_c(T, D)}{E(T, D)} \qquad \text{Equation 5}$$

which is simply the ratio of the coherent energy to the total energy normalized to the number of acoustic receivers, K, in the array. This ratio can range in value between 0 and 1.

The efficacy of this approach can be easily seen using a so-called STC plot, with, for example, slowness D on the horizontal axis and arrival time T on the vertical axis, or vice versa.

Figure 3:
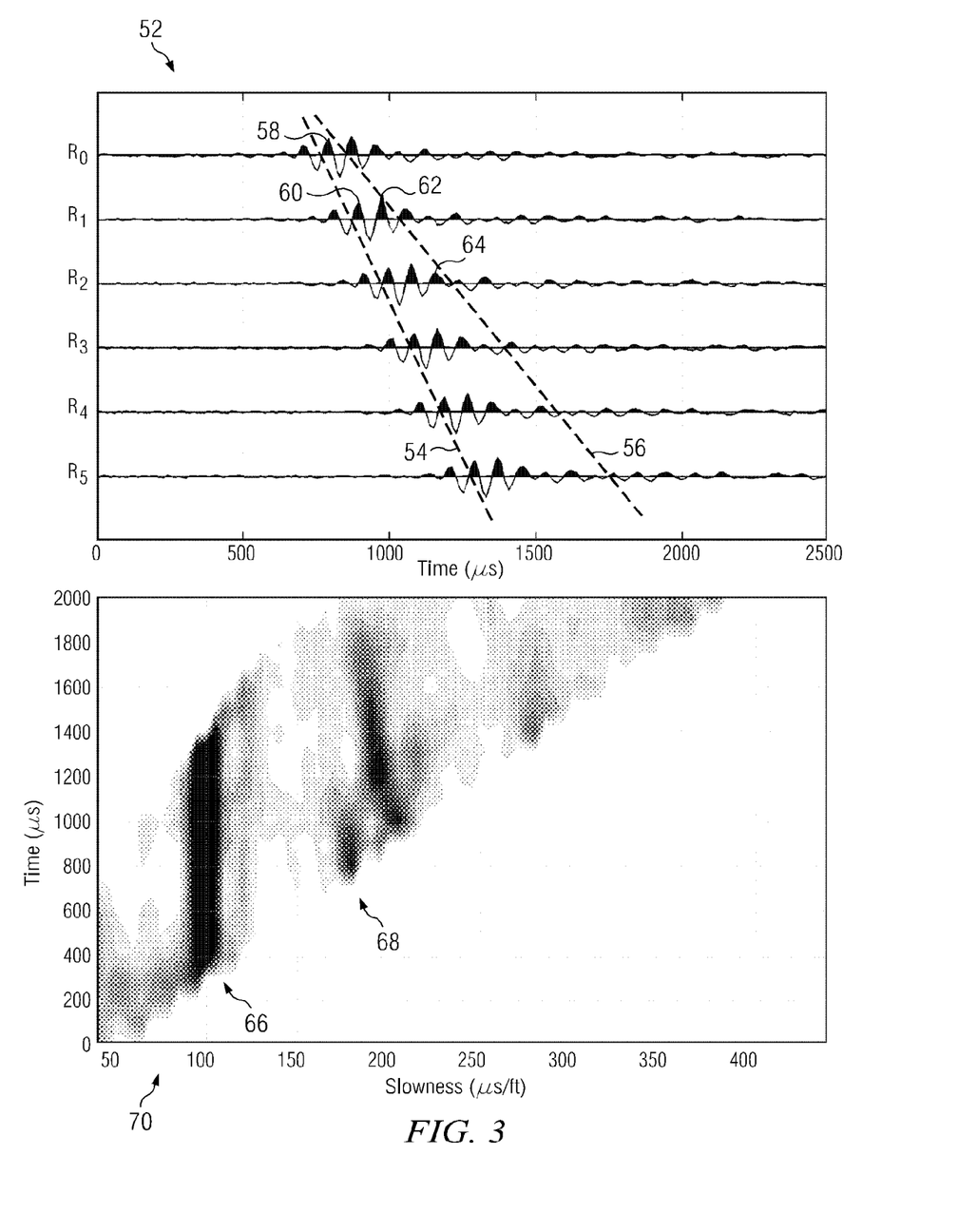
FIG. 3 depicts an example of acoustic waveform processing for the prior art tool depicted on FIG. 2.

FIG. 3 depicts an example of STC processing for the prior art tool depicted on FIG. 2. The upper plots 52 in FIG. 3 depict acoustic waveforms received at six consecutive receivers $R_0$, $R_1, \ldots, R_5$, which are spaced 12 inches apart. Line 54 plots $T+Dz_k$, for one value of the slowness D, e.g., $D_{comp}$ (the compressional wave slowness) and connects zero-crossings representing arrivals of the acoustic waveforms at consecutive receivers. In the STC analysis, the first peaks following line 54, for example, peaks 58, 60, and so on, contribute to enhance $E_c$. In other words, after shifting the received waveforms by $T+D_{comp}z_k$, the shifted waveforms constructively interfere in the STC analysis, resulting in a significant value for $E_c$, and thus a significant value for the coherence measure $R^2$. The compressional wave constructive interference peak is depicted at 66 on greyscale semblance plot 70.

With continued reference to FIG. 3, given sufficient time shift between the received waveforms for $R_0$ and $R_1$, peak 62 can also contribute with peak 58 to enhance $E_c$. Similarly, peak 64 of $R_2$ can likewise contribute to enhance $E_c$. This is depicted at line 56 which plots of $T+Dz_k$ for another value of D, e.g., $D_{alias}$, and connects zero-crossings one cycle later for $R_0$, two cycles later for $R_1$, three cycles later for $R_2$, and so on. In short, after shifting by $T+D_{alias}z_k$, the shifted waveforms constructive interfere in the STC analysis, so that a significant value for the coherence measure $R^2$ can result. The aliasing effect constructive interference peak is depicted at 68 on semblance plot 70.

It will be appreciated that the aliasing effect occurs when an additional cycle is skipped at each consecutive receiver. As seen in plot 52, the aliasing moveout starts at 2 cycles after the compressional arrival at the receiver $R_1$, 3 cycles after the compressional arrival at the receiver $R_2$, and so on.

One aspect of the present invention is the realization that the slowness of the compressional aliasing effect $D_{alias}$ can be predicted using the following equation:

$$D_{alias} = \frac{\Delta R \cdot D_{comp} + \Delta T}{\Delta R} \quad \text{Equation 6}$$

where $\Delta R$ is the receiver spacing, $D_{comp}$ is the compressional slowness, and $\Delta T$ is the period of each waveform cycle. Note that $D_{alias}$ depends on the compressional slowness of the formation, the receiver spacing, and the frequency. For an acoustic logging tool transmitting waveforms with a frequency of 12.5 kHz, with $\Delta R=1$ ft and $D_{comp}=98$ μs/ft, the slowness of the compressional aliasing effect is predicted to be $D_{alias}=178$ μs/ft, which agrees well with the location of the aliasing effect 68 in plot 70.

Equation 6 may also be utilized to predict the arrival of higher order compressional alias arrivals. For example, a second order alias may be predicted by replacing $\Delta T$ in Equation 6 with $2\Delta T$. It will be understood that a second order alias corresponds to skipping 2 cycles at $R_1$, 4 cycles at $R_2$, etc. A weak second order alias is observed at a slowness of about 260 μs/ft in FIG. 3.

A related aspect of the disclosed invention is the realization that the regular spacing of acoustic receivers in conventional acoustic logging tools is responsible for the aliasing effect. The present invention follows from the insight that, with non-uniform spacing between consecutive receivers in the array, the strong constructive interference which leads to aliasing is no longer possible. In particular, in the design of acoustic logging tool 100, the non-uniform spacing can be selected, for a given waveform frequency, so that skipping of an integral number of cycles between all pairs of consecutive receivers in the array is impossible. This can be seen by re-arranging Equation 6 as follows:

$$D_{alias} \cdot \Delta R = \Delta R \cdot D_{comp} + \Delta T \quad \text{Equation 7}$$

When the spacing is non-uniform, there is no single value of $D_{alias}$ for which Equation 7 can hold for all pairs of consecutive receivers in the array. In other words, since the receiver spacing is not constant across the array, there is no unique value for $D_{alias}$ in Equation 6. As a result, the constructive interference that occurs in the STC analysis is reduced in strength, significantly reducing or even eliminating the aliasing effect.

Figure 4:
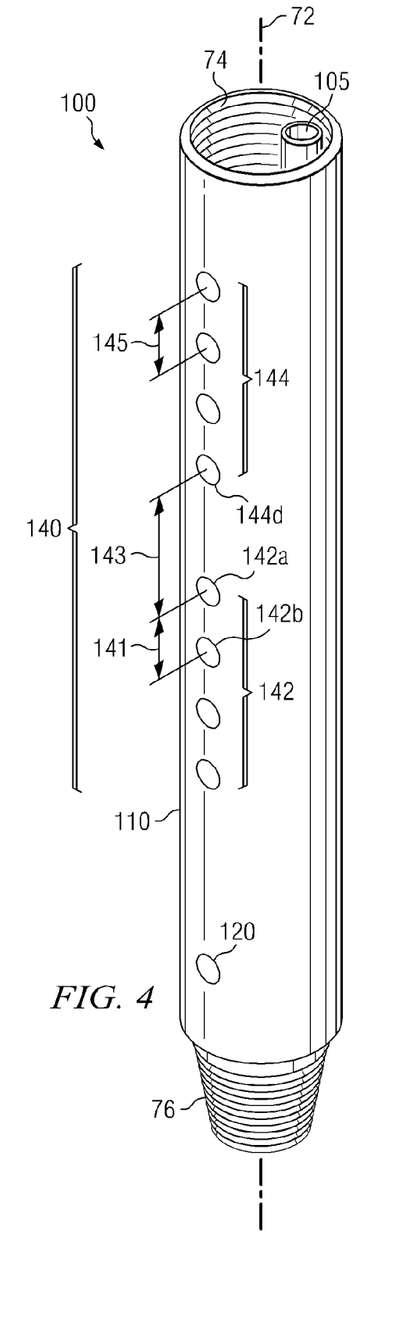
FIG. 4 depicts one exemplary embodiment of an acoustic logging tool in accordance with the present invention.

FIG. 4 depicts one exemplary embodiment of an acoustic logging tool 100 according to the present invention in perspective view. In FIG. 4, logging tool 100 is typically a substantially cylindrical tool, being largely symmetrical about cylindrical axis 72 (also referred to herein as a longitudinal axis). Logging tool 100 includes a substantially cylindrical downhole tool body 110 configured for connecting to a drill string and therefore typically, but not necessarily, includes threaded end portions 74 and 76. Through pipe 105 provides a conduit for the flow of drilling fluid downhole, for example, to a drill bit assembly. Logging tool 100 includes at least one acoustic transmitter 120 deployed on the tool body 110 and configured to transmit an acoustic waveform into a subterranean borehole. Logging tool 100 also includes a non-uniformly spaced array 140 of acoustic receivers deployed on an exterior surface of the tool body 110. It will be appreciated that many of the elements of the embodiment of FIG. 4 are also common to the alternative embodiments discussed below in connection with FIGS. 5 and 6.

In the exemplary embodiment depicted on FIG. 4, array 140 includes a plurality of longitudinally spaced apart receivers that are longitudinally spaced apart from the transmitter 120 and configured to receive a transmitted acoustic waveform to produce a set of received waveforms. The array 140 has a non-uniform longitudinal spacing such that at least one spacing between a first pair of consecutive receivers of the array differs from at least one other spacing between a second pair of consecutive receivers, for example, the spacing 141 between receivers 142a and 142b does not equal the spacing 143 between receivers 142a and 144d. It will be appreciated that while the embodiment shown includes one transmitter 120 and a receiver array having two uniformly spaced subarrays 142, 144, each with four receivers, this invention is not limited to any particular number of transmitters and receivers, or to any particular number of subarrays of uniformly spaced receivers. The invention is not even limited to embodiments having subarrays. For example, in certain embodiments the array 140 may include at least five acoustic receivers. In other embodiments, first and second subarrays 142 and 144 may each include three or more receivers. In other embodiments, at least one of the first and second subarrays may include at least four receivers. The invention is not limited in any of these regards.

Figure 5:
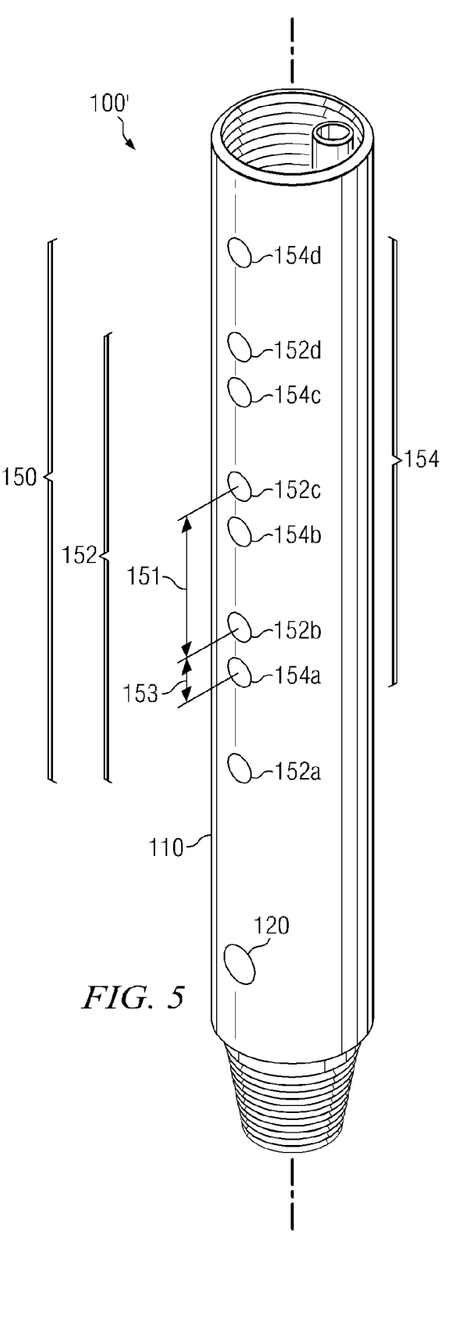
FIG. 5 depicts an alternative embodiment of an acoustic logging tool in accordance with the present invention.
Figure 6:
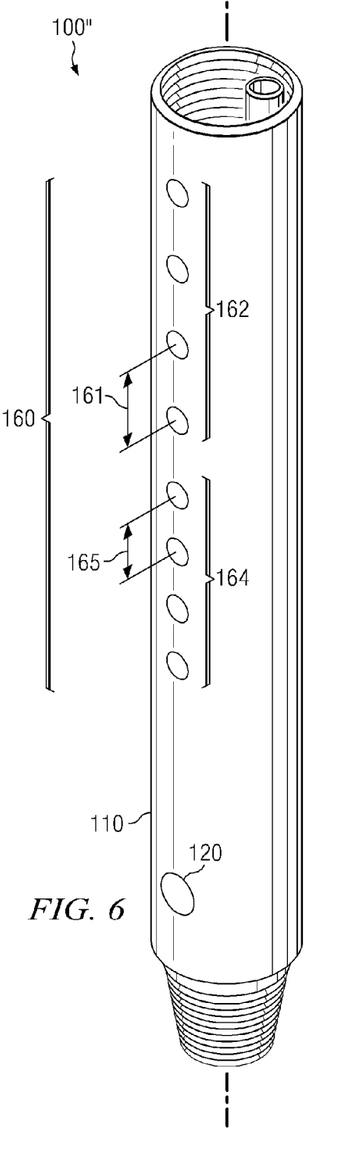
FIG. 6 depicts another alternative embodiment of an acoustic logging tool in accordance with the present invention.

While not depicted on FIGS. 4-6, it will be understood that the logging tool embodiments in accordance with the invention may include first and second transmitters (e.g., configured to transmit acoustic energy at distinct frequencies). In one exemplary embodiment, array 140 may be deployed, for example, axially between the transmitters. It will also be appreciated that this invention is not limited to any particular layout (positioning) of the transmitter(s) and receiver(s) on the tool 100. For example, tool 100 may alternatively include radially opposing transmitters and receiver arrays. While the invention is not limited in this regard, preferred embodiments of the invention (e.g., as depicted on FIGS. 4-6) employ linear arrays of acoustic receivers. In such a linear array, the arrayed receivers are arranged along a straight line (i.e., at a common circumferential position on the tool body 110). In still further preferred embodiments the transmitter 120 and the linear array of receivers are deployed at a common circumferential position.

In the exemplary embodiment depicted on FIG. 4, array 140 includes first and second subarrays 142 and 144. In this embodiment, consecutive receivers in the first subarray 142 have a uniform spacing of 141 and consecutive receivers in the second subarray 144 having a uniform spacing of 145. The first subarray 142 is further spaced from the second subarray 144 by a distance 143. In one exemplary embodiment of the invention, the second array 144 may be spaced apart from the first array 142 by a distance 143 that differs from at least one of the first and second spacings 141 and 145. In certain embodiments the spacings 141 and 145 between consecutive receivers in subarrays 142 and 144 may be equal (e.g., as depicted on FIG. 4). In other embodiments, acoustic logging tool may include a third or even fourth subarray of acoustic receivers. The invention is not limited in these regards.

It is to be understood that the reduction of the aliasing effect of the present invention can be accomplished with other types of non-uniform receiver arrays. FIGS. 5 and 6 depict other embodiments having non-uniform receiver arrays. Tool embodiment 100' depicted on FIG. 5 has a logging while drilling tool body 110 in which a transmitter 120 is longitudinally spaced apart from a non-uniformly spaced apart array 150 of acoustic receivers. Array 150 is arranged so that a first subarray 152 of receivers 152a-152d is interleaved with a second subarray 154 of receivers 154a-154d. In these embodiments an interarray distance 153 can be defined as the minimum spacing between an acoustic receiver of the first subarray and an acoustic receiver of the second subarray, for example, the distance between receiver 152b of the first subarray and receiver 154a of the second subarray. The invention is not limited to embodiments in which the subarrays 152 and 154 are fully interleaved. In other embodiments the subarrays 152 and 154 may be partially interleaved. In these embodiments, spacing 153 is preferably less than one half that of spacing 151.

Tool embodiment 100" depicted on FIG. 6 has a logging while drilling tool body 110 in which a transmitter 120 is longitudinally spaced apart from a non-uniformly spaced apart array 160 of acoustic receivers. Array 160 includes a first subarray 162 having a first spacing 161 between consecutive receivers and a second subarray 164 having a second spacing 165 between consecutive receivers. The second spacing 165 is not equal to (e.g., is less than) than first spacing 161.

Figure 7:
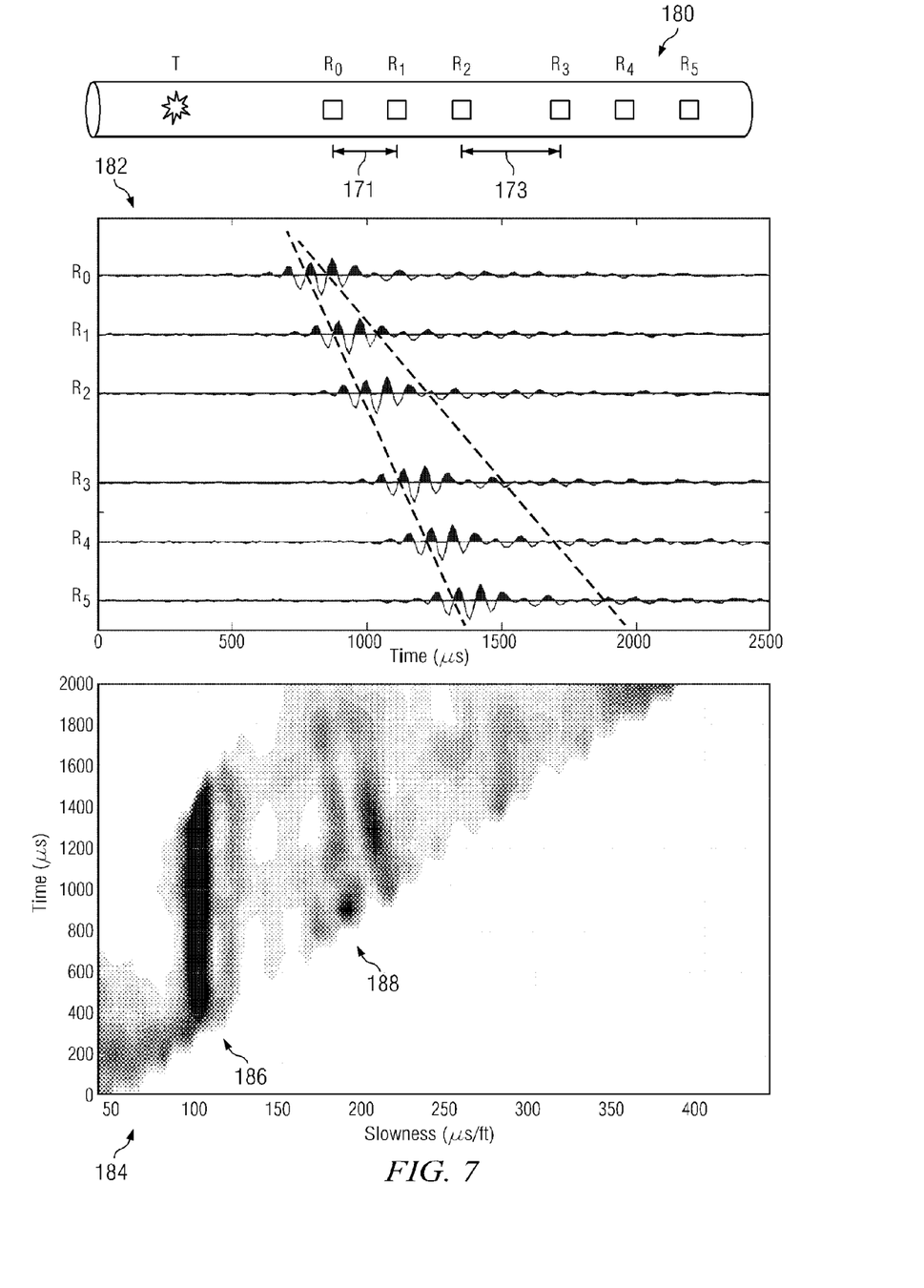
FIG. 7 depicts an example of acoustic waveform processing according to an embodiment of the present invention.
Figure 8:
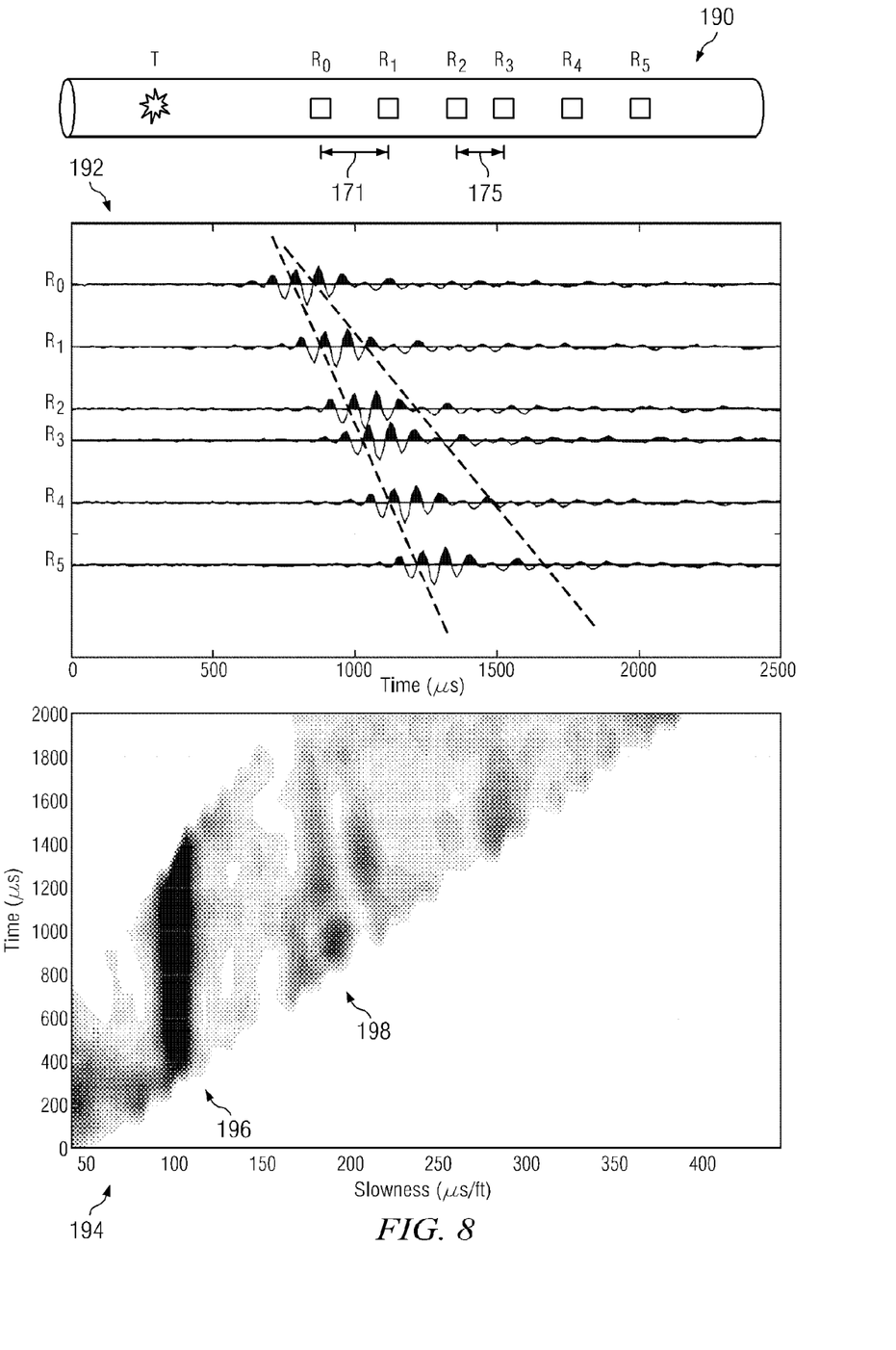
FIG. 8 depicts an example of acoustic waveform processing according to an alternative embodiment of the present invention.

FIGS. 7 and 8 depict additional examples of the invention which are intended to be purely exemplary and therefore should not be construed in any way as limiting the scope of the invention. These examples make use of theoretical arrays 180 and 190, which are similar to the comparative (prior art) example depicted on FIG. 2 in that each includes six receivers. Arrays 180 and 190 may be thought of as including first and second subarrays, each of which has three uniformly spaced receivers ($R_1$, $R_2$, $R_3$ and $R_4$, $R_5$, $R_6$). In FIG. 7, the spacing 173 between the subarrays is 50% greater than the uniform spacing 171 within the subarrays (i.e., spacing 173 is three halves that of spacing 171). In FIG. 8, the spacing 175 between the subarrays is 50% less than the uniform spacing 171 within the subarrays (i.e., spacing 175 is one half that of spacing 171).

Plot 182 in FIG. 7 depicts the acoustic waveforms received at the consecutive receivers in array 180. The waveforms are vertically spaced in plot 182 to correspond to the receiver spacings shown in array 180. The waveforms are subject to the standard time-slowness semblance analysis to yield the slowness of the compressional wave arrival including its aliasing. The vertical spacings on the graph 182 correspond to the time shifts that are applied to the received waveforms in the course of the coherence/semblance analysis. Because the spacings are non-uniform, differences between time shifts are also non-uniform. Thus, the effects of skipping one, two, three, and so on, cycles cannot be present when the shifts are applied to the received waveforms. In this manner, the strong constructive interference responsible for the aliasing effect in prior art tools is significantly reduced. This can be seen at 188 in the lower plot 184, which is a greyscale contour plot of a coherence measure as a function of slowness and time, showing considerable reduction of the coherence value associated with the aliasing effect (as compared to the prior art tool depicted on FIG. 3). As depicted at 186, there is essentially no change in the compressional arrival.

Plot 192 in FIG. 8 depicts the acoustic waveforms received at the consecutive receivers in array 190. The waveforms are vertically spaced in plot 192 to correspond to the receiver spacings shown in array 190. The waveforms are subject to the standard time-slowness semblance analysis to yield the slowness of the compressional wave arrival including its aliasing. Again, the vertical spacings on plot 192 correspond to the time shifts that are applied to the received waveforms in the course of the coherence/semblance analysis. Because the spacings are non-uniform, differences between consecutive time shifts are also non-uniform. Thus, the effects of skipping one, two, three, and so on, cycles cannot be present when the shifts are applied to the received waveforms. In this way, the strong constructive interference responsible for the aliasing effect is reduced, if not entirely eliminated. This can be seen at 198 in the lower plot 194, which shows considerable reduction of the coherence value associated with the aliasing effect (as compared to the prior art tool depicted on FIG. 3 and even as compared with the example depicted on FIG. 7). As also depicted at 196, there is essentially no change in the compressional arrival.

Figure 9:
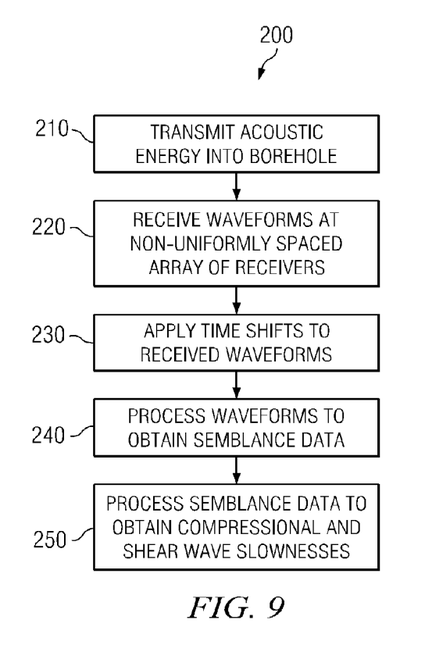
FIG. 9 depicts a flowchart of a method of processing received waveforms in accordance with the present invention for substantially reducing aliasing from received waveforms.

FIG. 9 depicts a flowchart 200 of a method of processing received waveforms in accordance with the present invention for substantially reducing aliasing from received waveforms. Briefly, at 210 an acoustic transmitter, such as transmitter 120 in FIG. 4, transmits an acoustic waveform into a borehole 40. As discussed previously, the transmitted waveform can induce waveforms in the subterranean formation. The acoustic waveforms induced in the formation are received at 220 by longitudinally spaced apart acoustic receivers, such as the receivers depicted in the non-uniformly spaced array 140 in FIG. 4. As discussed above in connection with FIGS. 7 and 8, time shifts are applied to the received waveforms at 230, the shifts being based on the non-uniform spacing of the array 140, and the waveforms further processed at 240 to obtain the semblance data (e.g., as displayed on an STC plot). The semblance data may be further processed at 250, for example, to obtain formation compressional and shear wave slownesses. In one exemplary embodiment, a downhole processor includes instructions for locating coherence peaks in the semblance data and for assigning a slowness value from one of the peaks as a compressional slowness and the slowness value from another of the peaks as a shear slowness.

Although not shown in FIGS. 4-6, it will be appreciated that downhole tools in accordance with this invention typically include an electronic controller. Such a controller typically includes conventional electrical drive voltage electronics (e.g., a high voltage power supply) for applying waveforms to the at least one transmitter to cause the transmitter to transmit an acoustic waveform. The controller typically also includes receiving electronics, such as a variable gain amplifier for amplifying the relatively weak return signal (as compared to the transmitted signal). That is, the controller is configured to cause the array of acoustic receivers to receive corresponding acoustic waveforms induced in the formation by the transmitted acoustic waveform. The receiving electronics may also include various filters (e.g., pass band filters), rectifiers, multiplexers, and other circuit components for processing the return signal. It will be appreciated that the controller may be disposed in the tool body 110, or may be located remotely from the tool body (e.g., elsewhere in the drill string). The invention is not limited in this regard.

A suitable controller typically further includes a digital programmable processor such as a microprocessor or a microcontroller and processor-readable or computer-readable programming code embodying logic, including instructions for controlling the function of the tool. Substantially any suitable digital processor (or processors) may be utilized, for example, including an ADSP-2191M microprocessor, available from Analog Devices, Inc.

The controller may be disposed, for example, to execute the method steps as described above with respect to FIG. 9. For example, the controller may be configured to cause the transmitter to transmit an acoustic waveform and to cause the receivers in the non-uniform array to receive the corresponding transmitted waveforms. The controller may be further configured to apply time shifts to the received waveforms, with the shifts being based on the non-uniform spacing of the receivers, to produce a set of shifted waveforms. The controller may also be configured to process the set of shifted waveforms to obtain semblance data having reduced aliasing effect and to process the semblance data to obtain compressive and/or shear wave slownesses.

A suitable controller may also optionally include other controllable components, such as other sensors, data storage devices, power supplies, timers, and the like. As described above, the controller may be disposed to be in electronic communication with the various sensors deployed in the drilling system. The controller may also optionally be disposed to communicate with other instruments in the drill string, such as telemetry systems that further communicate with the surface or a steering tool. Such communication can significantly enhance directional control while drilling. A controller may further optionally include volatile or non-volatile memory or a data storage device for downhole storage, for example, of received waveforms and computed semblance data. The invention is not limited in these regards.

Although the present invention and its advantages have been described in detail, it should be understood that various changes, substitutions and alternations can be made herein without departing from the spirit and scope of the invention as defined by the appended claims.

I claim:

1. A downhole acoustic measurement tool, comprising:
a downhole tool body;
at least one acoustic transmitter deployed on the tool body, the transmitter configured to transmit an acoustic waveform into a subterranean borehole;
an array of receivers deployed on an external surface of the tool body, the array including a plurality of longitudinally spaced apart acoustic receivers, the acoustic receivers being longitudinally spaced apart from the transmitter and configured to receive said transmitted acoustic waveform, the array having a non-uniform spacing such that a first spacing between a first pair of consecutive acoustic receivers in the array is not equal to a second spacing between a second pair of consecutive acoustic receivers in the array: and
wherein the array comprises first and second longitudinally spaced subarrays, each of the subarrays including a plurality of said acoustic receivers, the acoustic receivers in each subarray being uniformly spaced, the first and second subarrays being spaced apart from one another by a distance that is less than a distance between consecutive ones of the acoustic receivers in either of the first and second subarrays.

2. The downhole tool of claim 1, wherein the array comprises a linear array of acoustic receivers.

3. The downhole tool of claim 1, wherein the plurality of subarrays comprises first and second subarrays, the first and second subarrays being at least partially interleaved with one another.

4. The downhole tool of claim 1, wherein the non-uniformly spaced array includes at least five acoustic receivers.

5. The downhole tool of claim 1 further comprising a controller, the controller configured to (i) cause the transmitter to transmit an acoustic waveform, (ii) cause the non-uniformly spaced array of acoustic receivers to receive corresponding acoustic waveforms, and (iii) process said received waveforms to obtain semblance data.

6. The downhole tool of claim 5, wherein the controller is further configured to (iv) process the semblance data to obtain a shear wave slowness.

7. A downhole acoustic measurement tool, comprising:
a downhole tool body;
at least one acoustic transmitter deployed on the tool body, the transmitter configured to transmit an acoustic waveform into a subterranean borehole; and
an array of receivers deployed on an external surface of the tool body, the array including first and second subarrays;
each of the first and second subarrays comprising a plurality of longitudinally spaced apart acoustic receivers, the acoustic receivers being longitudinally spaced apart from the transmitter and configured to receive said transmitted acoustic waveform;
the first subarray having a first spacing between consecutive receivers, the second subarray having a second spacing between consecutive receivers, wherein the first spacing is not equal to the second spacing, and
wherein the first and second subarrays are longitudinally spaced apart from one another by a third spacing, the third spacing being equal to one of the first and second spacings.

8. The downhole tool of claim 7, wherein the array comprises a linear array of acoustic receivers.

9. The downhole tool of claim 7, wherein each of the first and second subarrays comprises at least three acoustic receivers.

10. A downhole acoustic: measurement tool, comprising:
a downhole tool body;
at least one acoustic transmitter deployed on the tool body, the transmitter configured to transmit an acoustic waveform into a subterranean borehole;
an array of receivers deployed on an external surface of the tool body, the array including first and second subarrays;

each of the first and second subarrays including a plurality of longitudinally spaced apart acoustic receivers, the acoustic receivers being longitudinally spaced apart from the transmitter and configured to receive said transmitted acoustic waveform; and the first subarray having a first spacing between consecutive receivers, the second array having a second spacing between consecutive receivers, the first spacing being equal to the second spacing, and the second subarray being longitudinally spaced apart from the first array by a third spacing that differs from at least one of the first spacing and the second spacing.

11. The downhole tool of claim 10, wherein the third spacing is less than the first spacing.

12. The downhole tool of claim 10, wherein the third spacing is greater than the first spacing.

13. A downhole acoustic measurement tool, comprising:
a downhole tool body:
at least one transmitter deployed on the tool body, the transmitter configured to transmit an acoustic waveform into a subterranean borehole;
an array of receivers deployed on an external surface of the tool body, the array including first and second subarrays;
each of the first and second subarrays including a plurality of longitudinally spaced apart acoustic receivers, the acoustic receivers being longitudinally spaced apart from the transmitter and configured to receive said transmitted acoustic waveform, the first and second subarrays having identical spacing between consecutive receivers;
at least a portion of the second subarray being interleaved with at least a portion of the first subrrays so as to define an interarray distance that is less than one-half the spacing between consecutive receivers in the first array.

14. The downhole tool of claim 13, wherein, the first and second subarrays are fully interleaved with one another.

15. A downhole acoustic measurement tool, comprising:
a downhole tool body;
at least one acoustic transmitter deployed on the tool body, the transmitter configured to transmit an acoustic waveform into a subterranean borehole;
an array of receivers deployed on an external surface of the tool body, the array including a plurality of longitudinally spaced apart acoustic receivers, the acoustic receivers being longitudinally spaced apart from the transmitter and configured to receive said transmitted acoustic waveform, the array having a non-uniform spacing such that a first spacing between a first pair of consecutive acoustic receivers in the array is not equal to a second spacing between a second pair of consecutive acoustic receivers in the array; and
the array of receivers including first and second subarrays, the first and second subarrays being at least partially interleaved with one another.

* * * * *